United States Patent
Qu

(10) Patent No.: US 8,842,759 B2
(45) Date of Patent: Sep. 23, 2014

(54) SYSTEM AND METHOD FOR ASK OFDM TRANSMISSION AND RECEPTION

(71) Applicant: Research In Motion Limited, Waterloo (CA)

(72) Inventor: Shouxing Qu, Gloucester (CA)

(73) Assignee: Blackberry Limited, Waterloo, Ontario (CA)

( * ) Notice: Subject to any disclaimer, the term of this patent is extended or adjusted under 35 U.S.C. 154(b) by 0 days.

(21) Appl. No.: 13/761,943

(22) Filed: Feb. 7, 2013

(65) Prior Publication Data

US 2013/0148764 A1 Jun. 13, 2013

Related U.S. Application Data

(62) Division of application No. 11/674,470, filed on Feb. 13, 2007, now Pat. No. 8,406,318.

(60) Provisional application No. 60/772,574, filed on Feb. 13, 2006.

(51) Int. Cl.
*H04K 1/10* (2006.01)

(52) U.S. Cl.
USPC ......................................... 375/260

(58) Field of Classification Search
USPC .......... 375/147, 260–262, 265, 267; 370/208, 370/210
See application file for complete search history.

(56) References Cited

U.S. PATENT DOCUMENTS

| | | | |
|---|---|---|---|
| 5,317,596 A | 5/1994 | Ho et al. | |
| 7,042,957 B1 * | 5/2006 | Zirwas | 375/295 |
| 2003/0227867 A1 | 12/2003 | Xiong | |
| 2004/0146115 A1 | 7/2004 | Feng et al. | |
| 2004/0252774 A1 | 12/2004 | Park | |
| 2006/0039273 A1 * | 2/2006 | Gore et al. | 370/208 |
| 2006/0072486 A1 | 4/2006 | Park | |

OTHER PUBLICATIONS

Xiong, Fuqin, "M-ary Amplitude Shift Keying OFDM System", IEEE Transactions on Communications, 51 (10):1638-1642, Oct. 2003.

Miguel Raul Dias Rodrigues; Modelling and Performance Assessment of OFDM Communication Systems in the Presence of Non-Linearities; a thesis submitted for the degree of Doctor of Philosophy, Oct. 2002, pp. 26-214, XP002432041.

* cited by examiner

*Primary Examiner* — Young T. Tse

(57) ABSTRACT

An OFDM system and method using amplitude shift keying (ASK) for subcarrier modulation is provided. Because ASK is used, the signal of each symbol in time domain is conjugate-symmetric. In addition, among the discrete numbers of each symbol, two of them are always real. These properties are utilized such that only half of the numbers of each symbol sequence are transmitted. The generated baseband signal can be a complex or a real signal. As a result, the bandwidth efficiency of the derived ASK-OFDM is the same as that of QAM-OFDM.

19 Claims, 9 Drawing Sheets

SYSTEM AND METHOD FOR ASK OFDM TRANSMISSION AND RECEPTION

RELATED APPLICATIONS

This application is a divisional application of U.S. patent application Ser. No. 11/674,470 filed on Feb. 13, 2007, which claims the benefit of U.S. Provisional Patent Application No. 60/772,574 filed on Feb. 13, 2006, both of which are hereby incorporated by reference in their entirety.

FIELD OF THE APPLICATION

The application relates to modulation and demodulation of OFDM sub-carriers.

BACKGROUND

Orthogonal frequency division multiplexing (OFDM) has been attracting an increasing interest in various broadband digital communication systems for more than 30 years, with applications now including digital audio/video broadcasting (DAB/DVB), high speed digital subscriber line (DSL) twisted pair, digital cable TV systems and local mobile wireless networks, among many others. In an OFDM system, the whole available frequency band is divided into N subchannels. Each subchannel is used to transmit an independently modulated subcarrier. Existing systems employ two-dimensional (2-D) digital modulation formats, mainly M-ary quadrature amplitude modulation (M-QAM) as well as M-ary phase-shift keying (M-PSK) for subcarrier modulation in various OFDM systems. To maintain orthogonality among subcarriers, a minimum frequency separation between adjacent subcarriers is 1/T, T being the period of an OFDM symbol. An inverse discrete Fourier transform (IDFT), often implemented by an inverse fast Fourier transform (IFFT) algorithm, and a discrete Fourier transform (DFT), often implemented by a fast Fourier transform (FFT), provide an efficient method for implementing orthogonal frequency division multiplexing and demultiplexing in an OFDM system. An OFDM signal with M-ary QAM for subcarrier modulation is often referred to as M-QAM-OFDM.

In a recent article by Fuqin Xiong, "M-ary amplitude shift keying OFDM system", IEEE Trans. on Commun., vol. 51, no. 10, pp. 1638-1642, October 2003, M-ASK-OFDM (OFDM using M-ary amplitude-shift keying (ASK) for subcarrier modulation) was proposed. Although an M-ary ASK symbol carries only half the number of bits as an $M^2$-ary QAM symbol, M-ASK-OFDM has a bandwidth efficiency equivalent to that of $M^2$-QAM-OFDM, because the minimum frequency separation between subcarriers in ASK-OFDM reduces to ½T, resulting in the number of subcarriers being doubled to 2N. Although what is disclosed by Xiong is correct in principle, some critical problems of implementation are not addressed in the paper.

BRIEF DESCRIPTION OF THE DRAWINGS

Embodiments will now be described with reference to the attached drawings in which.

DETAILED DESCRIPTION OF THE PREFERRED EMBODIMENTS

Figure 1A:
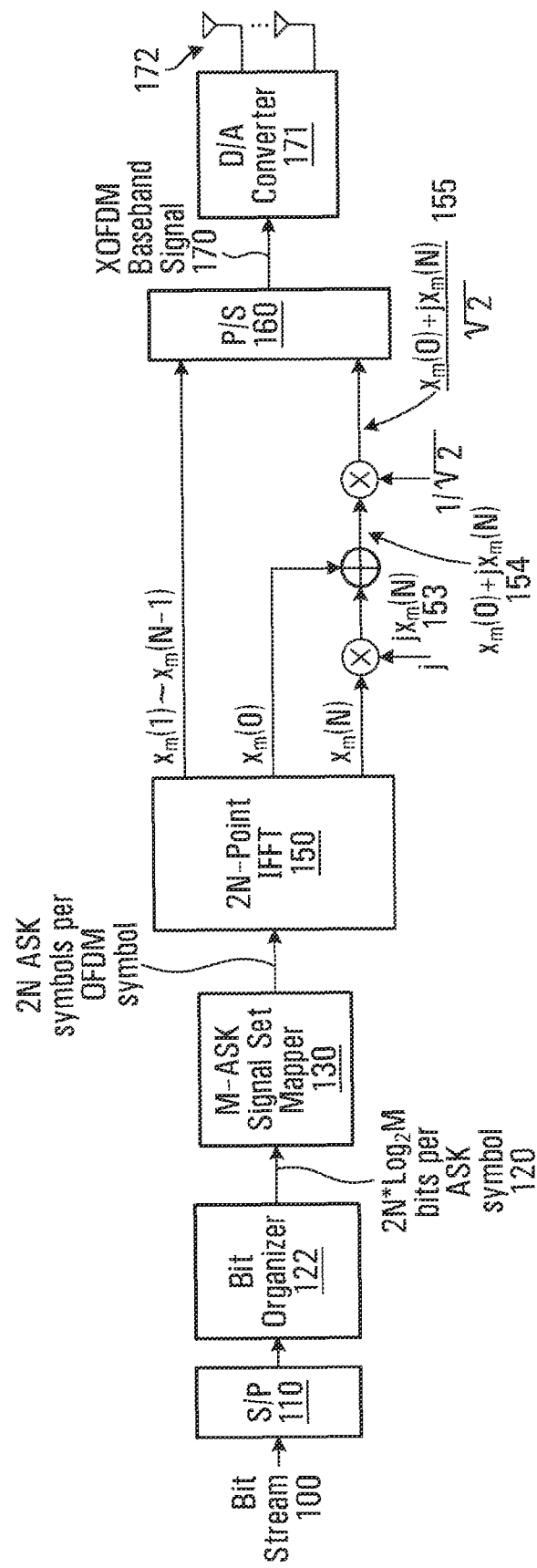
FIG. 1A is a block diagram of a method used to generate complex baseband ASK-OFDM symbols.

According to an aspect of the application, there is provided a method comprising: organizing bits to be transmitted into blocks each corresponding to a respective OFDM symbol, each block consisting of $N_b$ bits where there are 2N OFDM sub-carriers; further dividing each block of $N_b$ bits into a plurality of groups each consisting of $\log_2 M$ bits, where M is the number of signals in an M-ASK signal set and using the plurality of groups to define a number of frequency domain samples $a_m(k)$, k=0, 1, 2, ..., 2N−1 from the M-ASK signal set; performing at least part of a 2N-point IFFT on $a_m(k)$ to yield at least a first N time domain samples of a sequence $x_m(n)$, n=0, 1, 2, ..., 2N−1; converting at least N and at most N+1 of the time domain samples of $x_m(n)$ to an RF band signal; transmitting the RF band signal.

According to another aspect of the application, there is provided a method comprising: receiving OFDM symbols, each OFDM symbol having at least N time domain samples; for each OFDM symbol: expanding the at least N time domain samples into 2N time domain samples based on the at least N time domain samples having conjugate symmetry; performing a 2N-point FFT on the 2N time domain samples to yield a sequence $a_m(k)$, k=0, 1, 2, ..., 2N, resulting in 2N M-ASK symbols per OFDM symbol; de-mapping at least N+1 M-ASK symbols into a sequence of $N_b$ bits.

According to yet another aspect of the application, there is provided a transmitter comprising: at least one transmitting antenna; processing logic operable to: organize bits to be transmitted into blocks each corresponding to a respective OFDM symbol, each block consisting of $N_b$ bits where there are 2N OFDM sub-carriers, and M is a number of signals in an M-ASK signal set; further divide each block of $N_b$ bits into a plurality of groups each consisting of $\log_2 M$ bits, and using the plurality of groups to define a number of frequency domain samples $a_m(k)$, k=0, 1, 2, ..., 2N−1 from the M-ASK signal set; perform at least part of a 2N-point IFFT on $a_m(k)$ to yield at least a first N time domain samples of a sequence $x_m(n)$, n=0, 1, 2, ..., 2N−1; convert at least N and at most N+1 of the time domain samples of $x_m(n)$ to an RF band signal; transmit the RF band signal.

In some embodiments, $N_b=(N+1)\log_2 M$, and the processing logic is operable to: divide each block of $N_b$ bits into N+1 groups each consisting of $\log_2 M$ bits; use the N+1 groups to define N+1 frequency domain samples $a_m(k)$, k=0, 1, 2, ..., N from the M-ASK signal set; generate N−1 frequency domain samples $a_m(k)$, k=N+1, N+2, ..., 2N−1 according to $a_m(N+l)=a_m(N-l)$ for l=1, 2, ..., N−1, for a total number of 2N frequency domain samples; convert a first N+1 time domain samples of $x_m(n)$ to an RF band signal.

In some embodiments, $N_b=(2N \log_2 M)$, and the processing logic is operable to: divide each block of $N_b$ bits into 2N groups each consisting of $\log_2 M$ bits; use the 2N groups to define 2N frequency domain samples $a_m(k)$, $k=0, 1, 2, \ldots,$ 2N−1 from the M-ASK signal set; form a complex time domain sample using a first real time domain sample $x_m(N)$ and a second real time domain sample $x_m(0)$ wherein one of the first and second real time domain samples is added as an imaginary component to the other real time domain sample; convert a first N time domain samples of $x_m(n)$ to an RF band signal.

In some embodiments, the processing logic is further operable to: divide a result of the formed complex time domain sample using a first real time domain sample $x_m(N)$ and a second real time domain sample $x_m(0)$ by a scaling factor used to maintain average power for all N time domain samples.

In some embodiments, $N_b=(2N)\log_2 M$, and the processing logic is operable to: divide each block of $N_b$ bits into 2N groups each consisting of $\log_2 M$ bits; use the 2N groups to define 2N frequency domain samples $a_m(k)$, $k=0, 1, 2, \ldots,$ 2N−1 from the M-ASK signal set; convert a first N+1 time domain samples of $x_m(n)$ to an RF band signal.

In some embodiments, the processing logic comprises a serial to parallel converter to further divide each block of $N_b$ bits into a plurality of groups.

In some embodiments, the processing logic comprises a parallel to serial converter to convert at most N+1 the at least first N time domain samples of $x_m(n)$ to an RF band signal.

In some embodiments, the processing logic further comprises a digital to analog converter to convert the at least first N time domain samples of $x_m(n)$ to an RF band signal.

According to yet another aspect of the application, there is provided a receiver comprising: at least one receiving antenna; processing logic operable to: receive OFDM symbols, each OFDM symbol having at least N time domain samples; for each OFDM symbol: expand the at least N time domain samples into 2N time domain samples based on the at least N time domain samples having conjugate symmetry; perform a 2N-point FFT on the 2N time domain samples to yield a sequence $a_m(k)$, $k=0, 1, 2, \ldots,$ 2N, resulting in 2N M-ASK symbols per OFDM symbol; de-map at least N+1 M-ASK symbols into a sequence of $N_b$ bits.

In some embodiments, the processing logic further operable: decide an appropriate value for at least a first N+1 of the 2N M-ASK symbols per OFDM symbol resulting from the 2N-point FFT.

In some embodiments, for a received OFDM symbol with N time domain samples, at least one time domain sample of which is a complex value time domain sample comprising two time domain samples, one of which is a real component of the complex value time domain sample and one of which is an imaginary component of the complex value time domain sample, the processing logic further operable to: separate the real and imaginary components of the at least one complex time domain sample into two real time domain samples such that the received signal now has a total of N+1 time domain samples; wherein expanding the at least N time domain samples to 2N time domain samples comprises expanding the N+1 time domain samples into 2N time domain samples; following the 2N-point FFT, all of the 2N frequency domain samples of the sequence $a_m(k)$, $k=0, 1, 2, \ldots,$ 2N, are kept; de-mapping at least N+1 M-ASK symbols into a sequence of $N_b$ bits comprises de-mapping 2N M-ASK symbols into a sequence of $N_b=(2N)\log_2 M$ bits.

In some embodiments, prior to separating the real and imaginary components of the at least one complex value time domain sample into two real time domain samples, the processing logic is further operable to: multiply the at least one complex value time domain sample by a scaling factor used to maintain average power for all N time domain samples.

In some embodiments, the received OFDM symbol has N time domain samples and wherein expanding the at least N time domain samples to 2N time domain samples comprises expanding the N+1 time domain samples to 2N time domain samples; following the 2N-point FFT, all of the 2N frequency domain samples of the sequence $a_m(k)$, $k=0, 1, 2, \ldots,$ 2N, are kept; and de-mapping at least 2N M-ASK symbols into a sequence of $N_b$ bits comprises de-mapping 2N M-ASK symbols into a sequence of $N_b=(2N)\log_2 M$ bits.

In some embodiments, the received OFDM symbol has N time domain samples and wherein expanding the at least N time domain samples to 2N time domain samples comprises expanding the N+1 time domain samples to 2N time domain samples; following the 2N-point FFT, only N+1 of the 2N frequency domain samples of the sequence $a_m(k)$, $k=0, 1, 2, \ldots,$ 2N, are kept; and de-mapping at least N+1 M-ASK symbols into a sequence of $N_b$ bits comprises de-mapping N+1 M-ASK symbols into a sequence of $N_b=(N+1)\log_2 M$ bits.

In some embodiments, the processing logic comprises a serial to parallel converter to receive OFDM symbols.

In some embodiments, the processing logic comprises a parallel to serial converter to de-map at least N+1 M-ASK symbols into a sequence of $N_b$ bits.

In some embodiments, the processing logic further comprises an analog to digital converter to receive OFDM symbols.

According to another aspect of the application, there is provided a method of generating and transmitting an OFDM symbol comprising: performing a part of a 2N point IFFT from 2N inputs to generate an output sequence with at least N+1 elements out of a possible 2N elements; performing one of: a) adding the N+1$^{st}$ element as imaginary part to the first element and transmitting a first N elements of the output sequence after analog and RF conversion; and b) transmitting a first N+1 elements of the output sequence after analog and RF conversion.

Referring again to the reference of Xiong identified above, one problem not addressed by Xiong is that since the frequency separation in ASK-OFDM is half of that in QAM-OFDM, the number of points in each symbol is doubled, corresponding to a time period of 2T for each symbol. This raises a question of how to transmit each symbol with double the number of points within the same time period of T and the same bandwidth as in QAM-OFDM. It should be noted that if the 2N points are transmitted in T, the signal bandwidth must be expanded, which is not acceptable. Another problem not addressed by Xiong is that the implementation of the proposed system is based on the theory of cosine transform (CT) using inverse fast cosine transform (IFCT) and fast cosine transform (FCT) for implementation. A problem with using IFCT and FCT is that these transforms can only be used for "real-valued" OFDM systems, which excludes applications of "complex-valued" OFDM systems.

An ASK-OFDM modulation scheme based on the theory of discrete Fourier transform and systems using the ASK-OFDM modulation scheme are described herein. In some embodiments, ASK-OFDM provides a method with a higher frequency resolution than QAM-OFDM, which enables distribution of signal energy in frequency more evenly than QAM-OFDM.

Review of QAM-OFDM

A pass-band signal transmitted at radio frequency (RF) by a transmitter side of a communication system can be represented in general by $$x_{RF}(t) = Re\{x(t)\exp(j2\pi f_c t)\} \quad (1)$$

where $Re\{u\}$ stands for the real part of a complex variable $u$, $f_c$ the carrier frequency, and $x(t)$ the equivalent baseband signal of $x_{RF}(t)$. The discrete form of $x(t)$ is defined as $x(n) = x(nT_s)$, where $T_s = T/N$ is the sampling period, $N$ the number of subcarriers, and $T$ the period of an OFDM symbol.

In a 2-D OFDM system (OFDM systems using 2-dimensional digital modulation formats for subcarrier modulation), the minimum frequency separation between adjacent subcarriers is $1/T$. A discrete baseband OFDM symbol consists of $N$ time domain samples, i.e.

$$x_m(n) = IDFT\{a_m(k)\} = \frac{1}{N}\sum_{k=0}^{N-1} a_m(k)\exp\left(\frac{j2\pi nk}{N}\right) \quad (2)$$

for $n = 0, 1, \ldots, N-1$ where $IDFT\{u(k)\}$ stands for IDFT of a sequence $u(k)$. In a QAM-OFDM, $a_m(k)$'s are independent complex values taken from an M-QAM signal set, representing the data sequence to be transmitted in the m-th symbol. From the viewpoint of DFT, $a_m(k)$ and $x_m(n)$ can be interpreted as representations of the same digital signal in frequency domain and time domain respectively. The sequence of N time domain samples of $x_m(n)$ is transmitted in a symbol period of T within a null-to-null bandwidth $(N+1)/T$, which approximates to $N/T$ for sufficiently large N. A cyclic prefix that is usually attached in front of each OFDM symbol is not taken into account here.

In general, $x_m(n)$ is a sequence of complex time domain samples. However, as a special case, it may be a sequence of real time domain samples, depending on the structure of $a_m(k)$. According to the properties of DFT/IDFT, if $a_m(k)$ in Eq. (2) is a conjugate-symmetric sequence, i.e.

$$a_m(N/2+l) = a_m^*(N/2-l) \text{ for } l=1, 2, \ldots, N/2-1 \quad (3)$$

where * stands for complex conjugate, then $x_m(n)$'s are all real values; otherwise they are complex in general. For convenience in the description that follows, OFDM with a real baseband time-domain signal is referred to as real OFDM (ROFDM) and OFDM with a complex baseband time-domain signal is referred to as complex OFDM (XOFDM). A baseband XOFDM signal transmitted at RF uses two quadrature carriers (e.g. cosine and sine waveforms), while a ROFDM signal transmitted at RF uses only one RF carrier. Both ROFDM and XOFDM QAM systems are currently in use.

On a receiver side of a communication system, the sequence of $a_m(k)$ (frequency domain samples) can be recovered from $x_m(n)$ using the DFT in the form, $$a_m(k) = DFT\{x_m(n)\} = \sum_{n=0}^{N-1} x_m(n)\exp\left(\frac{-j2\pi nk}{N}\right) \quad (4)$$

for $k = 0, 1, \ldots, N-1$ where $DFT\{u(n)\}$ stands for the DFT of a sequence $u(n)$.

ASK-OFDM Based on Fourier Transform

For a given bandwidth $N/T$ that is approximately equal to the bandwidth of a QAM-OFDM system, M-ary ASK can be used to replace $M^2$-ary QAM as the subcarrier modulation scheme. In order to maintain the same data rate as that of the QAM-OFDM system, 2N subcarriers are needed to transmit 2N ASK symbols in each OFDM symbol. The baseband symbol is then defined as $$x_m(n) = \frac{1}{2N}\sum_{k=0}^{2N-1} a_m(k)\exp\left(\frac{j2\pi nk}{2N}\right) \quad (5)$$

for $n = 0, 1, \ldots, 2N-1$ where $a_m(k)$ is a sequence of 2N real frequency domain samples taken from an M-ary ASK signal set. The frequency separation of adjacent subcarriers now is $\frac{1}{2}T$, implying that the time period needed to transmit all of 2N time domain samples of $x_m(n)$ is 2T. Since $a_m(k)$'s are all real, according to the properties of DFT/IDFT, $x_m(n)$ is conjugate-symmetric such that $$x_m(N+l) = x_m^*(N-l) \text{ for } l=1, 2, \ldots, N-1. \quad (6)$$

Thus, all information to represent the sequence is contained in the first N+1 time domain samples of the sequence. In other words, the first N+1 time domain samples of $x_m(n)$, $n=0, 1, \ldots, 2N-1$, are the only time domain samples that need to be transmitted. Consequently, the time needed to transmit the necessary N+1 time domain samples is $T_A = (1+1/N)T$.

In addition to the property of conjugate-symmetry, the sequence $x_m(n)$ of an ASK-OFDM symbol as defined in Eq. (5) possesses both of the following two features:

(i) Without any symmetric restriction on the sequence of $a_m(k)$, $x_m(n)$ is a sequence of complex time domain samples in general, implying an XOFDM symbol. However, if $a_m(k)$ is forced to have conjugate-symmetry, that is $$a_m(N+l) = a_m(N-l) \text{ for } l=1, 2, \ldots, N-1 \quad (7)$$

then $x_m(n)$ is a sequence of all real elements, implying an ROFDM symbol;

(ii) Because of the conjugate-symmetry of $x_m(n)$, $x_m(0)$ and $x_m(N)$ must be real time domain samples. This can be verified strictly from Eq. (5), that is, for n=0 and N, $$x_m(0) = \frac{1}{2N}\sum_{k=0}^{2N-1} a_m(k) \quad (8)$$

$$x_m(N) = \frac{1}{2N}\sum_{k=0}^{2N-1} a_m(k)\exp(jk\pi) \quad (9)$$

$$= \frac{1}{2N}\sum_{k=0}^{2N-1} (-1)^k a_m(k).$$

Eqs. (8) and (9) reveal that the imaginary part of $x_m(0)$ and $x_m(N)$ are always zero, implying that the imaginary parts of $x_m(0)$ and $x_m(N)$ do not carry any information. These unused resources can be used, if desired, in some cases to increase the bit rate. This is possible if a complex ASK-OFDM is to be generated. A possible way to take advantage of this property is to transmit $x_m(N)$ as the imaginary part of $x_m(0)$, so that a total number of transmitted time samples is reduced from N+1 to N. In some embodiments, $x_m(0)$ is transmitted as the imaginary part of $x_m(N)$. Correspondingly, the time needed to transmit a symbol reduces from $T_A$ to T, exactly the same as a QAM-OFDM symbol period.

Therefore, a real baseband ASK-OFDM symbol is defined as $$x_m(n) = \begin{cases} \dfrac{1}{2N} \sum_{k=0}^{2N-1} a_m(k) \exp\left(\dfrac{j2\pi nk}{2N}\right) & \text{for } n = 0, 1, 2, \ldots, N \\ x_m*(N-l) & \text{for } n = N+l, \\ & l = 1, 2, \ldots, N-1 \end{cases} \quad (10)$$

while a complex base-band ASK-OFDM symbol is defined as $$x_m(n) = \begin{cases} \dfrac{1}{2N} \sum_{k=0}^{2N-1} a_m(k) \exp\left(\dfrac{j2\pi nk}{2N}\right) & \text{for } n = 1, 2, \ldots, N-1 \\ \dfrac{1}{2\sqrt{2}\,N} \begin{bmatrix} \sum_{k=0}^{2N-1} a_m(k) + \\ j\sum_{k=0}^{2N-1} (-1)^k a_m(k) \end{bmatrix} & \text{for } n = 0 \\ x_m*(N-l) & \text{for } n = N+l, \\ & l = 1, 2, \ldots, N-1 \end{cases} \quad (11)$$

Note that the term of $x_m(0)$ in Eq. (11) has been scaled down with a factor of $1/\sqrt{2}$ to keep the average power of $x_m(0)$ unchanged. However, it is to be understood that a scaling factor other than $1/\sqrt{2}$ may be used or no scaling factor may be used. Therefore, the average power of $x_m(0)$ may be different with respect to the other time domain samples of $x_m(n)$ when a different scaling factor or no scaling factor is used. In Eq. (11), only $x_m(n)$, n=0, 1, 2, . . . , N−1 are transmitted, but in Eq. (10), $x_m(N)$ is also transmitted. Note that transmitting half of the whole sequence $x_m(n)$ for each symbol does not require a wider bandwidth, since the time separation between adjacent numbers of $x_m(n)$ is not changed. Therefore, an M-ASK-OFDM transmitter can transmit the same number of bits in the same time period within almost the same bandwidth as an $M^2$-QAM-OFDM transmitter.

In a receiver receiving an ASK-OFDM signal, the full sequence of $x_m(n)$, n=0, 1, 2, . . . , 2N−1 time domain samples can be recovered from the received N or N+1 time domain samples (for the complex case) or N+1 time domain samples (for the real case) of the sequence due to its conjugate-symmetry, and then the sequence of $a_m(k)$ can be recovered from the full sequence of $x_m(n)$ using the DFT, for example by using an FFT as $$a_m(k) = FFT\{x_m(n)\} \quad (12)$$
$$= \sum_{n=0}^{2N-1} x_m(n) \exp\left(\dfrac{-j2\pi nk}{2N}\right)$$

for $k = 0, 1, \ldots, 2N-1$.

In the complex case, when N time domain samples are received, one of the N time domain samples being a result of two real value time domain samples being combined and transmitted as a complex value time domain sample as described above, the received complex value time domain sample is separated into two real time domain samples resulting in a total of N+1 time domain samples. Prior to the complex valued time domain sample being separated into the two real time domain samples, the complex value time domain sample may be multiplied by a scaling factor, such as $\sqrt{2}$, to compensate for a scaling factor applied to the complex value time domain signal at the transmitter.

With reference to FIG. 1A, an example of a method for generating a signal including complex baseband ASK-OFDM symbols will now be described. FIG. 1A can be considered to describe a method as well as physical structure that may be used to implement the method. The following description is with regard to a series of bits for a single ASK-OFDM symbol, but the same method is applied to each grouping of bits that form an individual ASK-OFDM symbol in a sequence of bits forming multiple ASK-OFDM symbols.

A serial stream of bits 100 is converted using a serial to parallel converter (S/P) 110 to 2N parallel sets of bits, each parallel set including $\log_2 M$ bits. The 2N parallel sets of bits are organized by a bit organizer 122 to collectively form a block, each block corresponding to an ASK-OFDM symbol. Each block consists of $N_b$=2N $\log_2 M$ bits 120. Each set of $\log_2 M$ bits is mapped to one of M signals at an M-ASK signal set mapper 130 to produce 2N ASK symbols $a_m(k)$, k=0, 1, 2, . . . , 2N−1.

A 2N-point IFFT 150 is applied to $a_m(k)$ to implement the IFDT and yield a sequence of time domain samples $x_m(n)$. Eq. (5) is an example of a result once the transform is applied. As described above, in some embodiments, the sequence $x_m(n)$ includes a group of 2N time domain samples. In some embodiments, only the first N+1 time domain samples of the total number of 2N output time domain samples are calculated since the remaining N−1 time domain samples are not transmitted. For this reason, in some embodiments, the full 2N point IFFT is not computed. The minimum number of computations that must be performed is that required to produce the first N+1 time domain samples of the output sequence. In other words, it is most efficient to only calculate and keep the first N+1 time domain samples $x_m(n)$, n=0, 1, 2, . . . , N, from a set of 2N frequency domain samples applied to the IFFT.

For complex ASK-OFDM, in some embodiments, the first N+1 time domain samples of the total number of 2N time domain samples are kept for eventual transmission. In some embodiments, the N+1 time domain samples can be reduced to N time domain samples as described above. As two of the time domain samples, $x_m(0)$ and $x_m(N)$, are always real, the unused imaginary component of one time domain sample can be used to transmit the other time domain sample. In the illustrated example, the output $x_m(n)$ of the 2N-Point IFFT 150 includes time domain samples $x_m(0)$, $x_m(1)$ to $x_m(N-1)$ and $x_m(N)$.

Time domain sample $x_m(N)$ is converted into an imaginary value $jx_m(N)$ 153 and is added to $x_m(0)$, resulting in $x_m(0)$+$jx_m(N)$ 154. The newly combined time domain sample $x_m(0)$+$jx_m(N)$ 154 is divided by $\sqrt{2}$, resulting in $$\dfrac{x_m(0) + jx_m(N)}{\sqrt{2}} 155.$$

Time domain sample $$\dfrac{x_m(0) + jx_m(N)}{\sqrt{2}} 155,$$

along with $x_m(1)$ to $x_m(N-1)$ are kept for eventual transmission.

The resulting N or N+1 time domain samples, depending on whether two of the N+1 time domain samples are combined or not, are then converted using a parallel to serial converter (P/S) 160 from a parallel set to a serial stream of time domain samples, forming an XOFDM baseband signal $x_m(n)$ 170. The XOFDM baseband signal $x_m(n)$ 170 can then be converted from a discrete sampled signal to an analog signal, for example with a digital to analog (D/A) converter 171. The analog signal is then converted to RF band and transmitted using one or more antennas 172. In the event there are N+1 time domain samples a time period of $T_A$ is used. In the event there are N time domain samples a time period of T is used.

In some embodiments, bit stream 100 is a stream of serial bits from a single user for transmission. In some embodiments, bit stream 100 is a stream of bits from multiple users using for transmission by the same transmitter that are multiplexed together. The multiplexed signals from each user may be part of one ASK-OFDM symbol, one ASK-OFDM symbol, or more than one ASK-OFDM symbol per multiplexing slot per user.

Figure 1B:
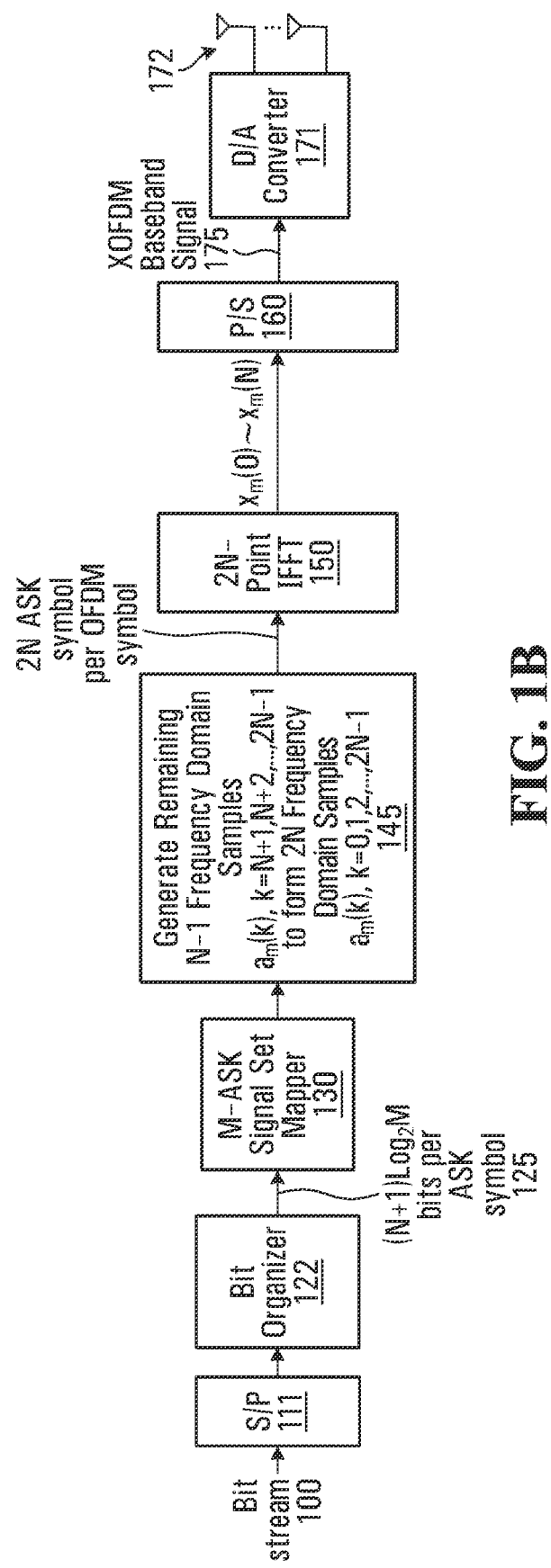
FIG. 1B is a block diagram of a method used to generate real baseband ASK-OFDM symbols.

With reference to FIG. 1B, an example of a method for generation of a signal including real baseband ASK-OFDM symbols will now be described. FIG. 1B can be considered to describe a method as well as physical structure that may be used to implement the method. The method described below has several steps in common with those that used in the generation of the signal including complex baseband ASK-OFDM symbols of FIG. 1A.

A serial stream of bits 100 is converted using a serial to parallel converter (S/P) 111 to N+1 parallel sets of bits, each parallel set including $\log_2 M$ bits. The N+1 parallel sets of elements are organized by a bit organizer 122 to collectively form a block, each block corresponding to an ASK-OFDM symbol. Each block consists of $N_b=(N+1)\log_2 M$ bits 125. Each set of $\log_2 M$ bits is mapped to one of M signals at an M-ASK signal set mapper 130 to produce N+1 ASK symbols $a_m(k), k=0, 1, 2, \ldots, N$.

A 2N bit ASK symbol $a_m(k), k=1, 2, \ldots, 2N-1$ is generated for each ASK-OFDM symbol by using the N+1 real frequency domain samples $a_m(k), k=0, 1, 2, \ldots, N$, and generating 145 the remaining N−1 real frequency domain samples of $a_m(k), k=N+1, N+2, \ldots, 2N-1$, for example according to $a_m(N+l)=a_m(N-l)$ for $l=1, 2, \ldots, N-1$.

A 2N-point IFFT 150 is applied to $a_m(k)$ to yield a sequence of time domain samples $x_m(n)$. As described above, in some embodiments, the sequence $x_m(n)$ includes a group of 2N real time domain samples. In some embodiments, it is most efficient to only calculate the first N+1 elements of $x_m(n)$.

For real ASK-OFDM, the first N+1 time domain samples of $x_m(n)$ are kept for eventual transmission of the total number of 2N elements for eventual transmission.

The resulting N+1 time domain samples, are then converted using a parallel to serial converter (P/S) 160 from a parallel set to a serial stream of time domain samples forming an ROFDM baseband signal $x_m(n)$ 175. The ROFDM baseband signal $x_m(n)$ 175 can then be converted from a discrete sampled signal to an analog signal, for example with a digital to analog (D/A) converter 171. The analog signal is then converted to RF band, if desired, and transmitted using one or more transmit antennas 172. For the N+1 time domain samples, a time period of $T_A$ is used.

Figure 1C:
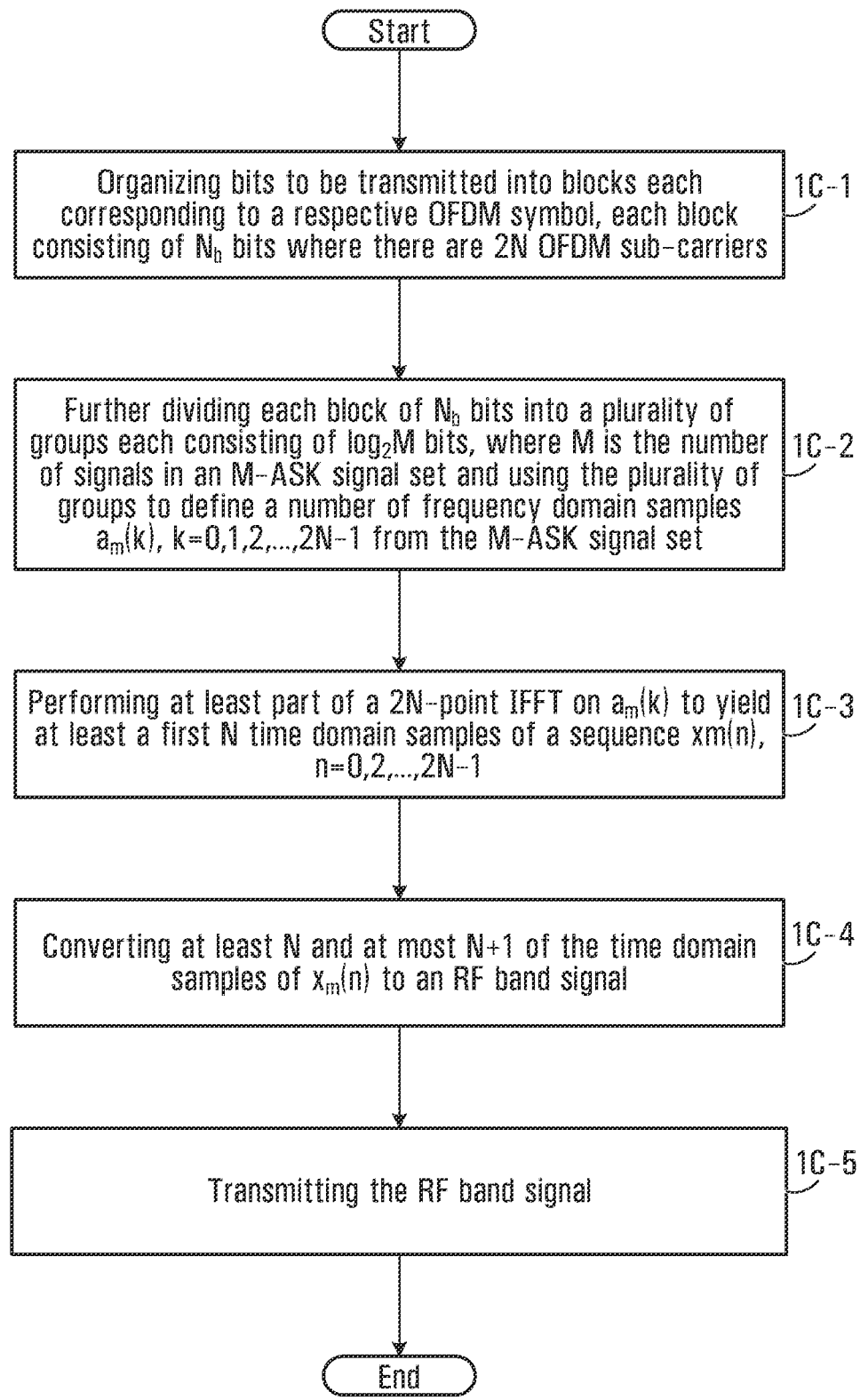
FIG. 1C is a block diagram of a method used to generate and transmit ASK-OFDM symbols.

A method for generating and transmitting ASK-ODFM symbols for XOFDM or ROFDM will be described with reference to the flow chart of FIG. 1C.

Step 1C-1 includes organizing bits to be transmitted into blocks each corresponding to a respective OFDM symbol, each block consisting of $N_b$ bits where there are 2N OFDM sub-carriers.

Step 1C-2 includes further dividing each block of $N_b$ bits into a plurality of groups each consisting of $\log_2 M$ bits, where M is the number of signals in an M-ASK signal set and using the plurality of groups to define a number of frequency domain samples $a_m(k), k=0, 1, 2, \ldots, 2N-1$ from the M-ASK signal set.

Step 1C-3 includes performing at least part of a 2N-point IFFT on $a_m(k)$ to yield at least a first N time domain samples of a sequence $x_m(n), n=0, 1, 2, \ldots, 2N-1$.

Step 1C-4 includes converting at least N and at most N+1 of the time domain samples of $x_m(n)$ to an RF band signal. For example, for XOFDM N or N+1 samples of the at least first N time domain samples may be converted and kept for transmission and for ROFDM N+1 samples of the at least first N time domain samples may be converted and kept for transmission.

Step 1C-4 may include for example, converting a parallel set to a serial stream of time domain samples forming a baseband signal $x_m(n)$ as well as converting the discrete sampled time domain signal to an analog signal.

Step 1C-5 includes transmitting the RF band signal.

The methods described above with regard to FIGS. 1A and 1B are implemented by a device transmitting a signal. In some embodiments, the device is a mobile station. Examples of a mobile station may include a cell phone, a computer with a wireless modem, a wireless communication enabled personal data assistant (PDA). A mobile station may be either nomadic or have fixed position. In some embodiments, the device is a base station used to communicate with mobile stations.

In some embodiments the methods can be physically implemented using techniques familiar to those skilled in the field of the application. For example, using application specific integrated circuits (ASIC) or field programmable gate arrays (FPGA) for a hardware implementation. To implement the methods in software, in some embodiments a microprocessor capable of performing basic digital signal processing operations is utilized. A mix of both hardware and software is also contemplated.

Figure 2A:
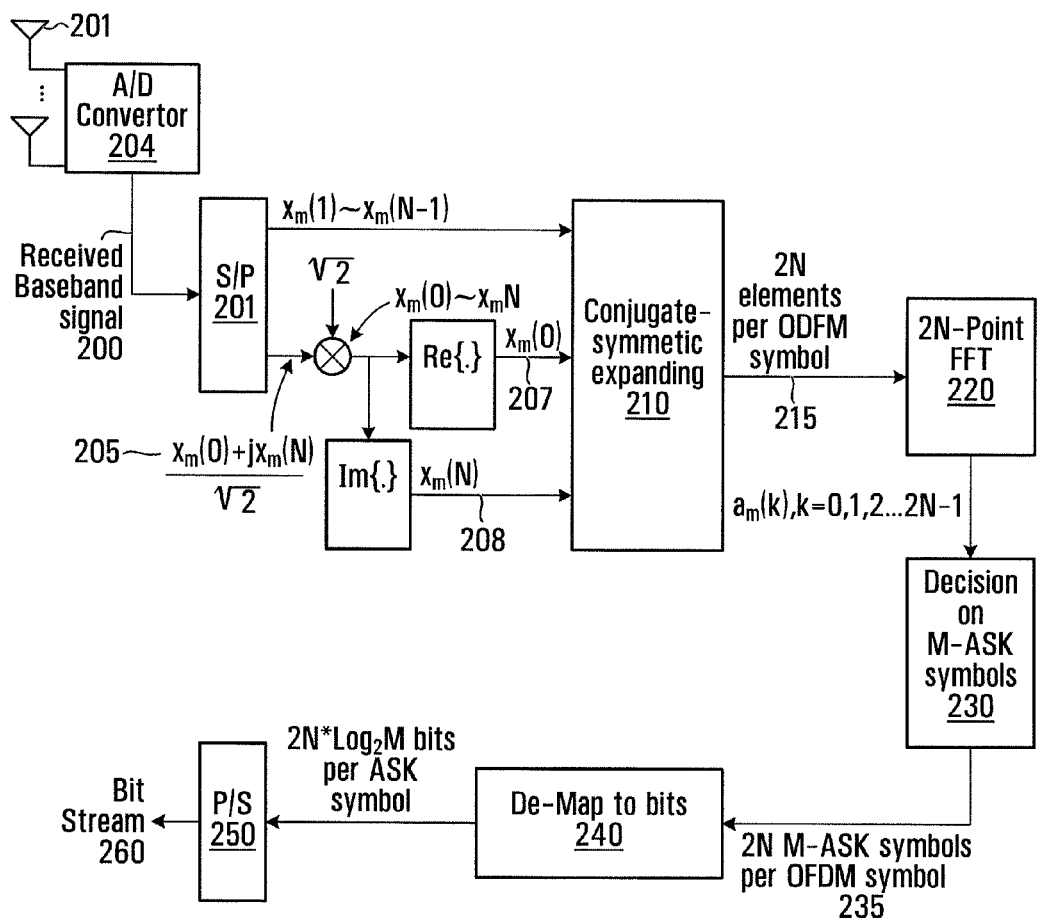
FIG. 2A is a block diagram of a method used to demodulate complex baseband ASK-OFDM symbols.

With reference to FIG. 2A, an example of a method for demodulation of the complex ASK-OFDM will now be described. FIG. 2A can be considered to describe a method as well as physical structure that may be used to implement the method. In some embodiments, prior to the first step of FIG. 2A, an RF band signal is received using one or more antennas 201 and down converted to an analog baseband signal and the analog signal baseband signal is converted to a discrete baseband XOFDM signal 200, for example with an analog to digital (A/D) converter 204.

The following description is with regard to a series of bits for a single OFDM symbol, but the same method is applied to each grouping of bits that form an individual OFDM symbol in a sequence of OFDM symbols.

XOFDM baseband signal 200 is converted by using a serial to parallel converter (S/P) 201 from a serial stream of time domain samples to a parallel set of time domain samples. In the illustrated example, the parallel set of time domain samples includes $x_m(1)$ to $x_m(N-1)$ and $$\frac{x_m(0)+jx_m(N)}{\sqrt{2}}\textbf{205}.$$

A first step of separating $x_m(0)$ and $x_m(N)$ in $$\frac{x_m(0) + jx_m(N)}{\sqrt{2}} 205$$

involves multiplying $$\frac{x_m(0) + jx_m(N)}{\sqrt{2}}$$

by $\sqrt{2}$, which results in $x_m(0)+jx_m(N)$. A second step of separating $x_m(0)$ from $x_m(N)$ involves separating the real and imaginary components into real components $x_m(0)$ 207 and $x_m(N)$ 208.

The N+1 time domain samples $x_m(0)$ to $x_m(N)$ are then expanded 210 using conjugate symmetric expanding to 2N time domain samples 215 based on the N+1 time domain samples having conjugate symmetry.

A 2N-Point FFT 220 is applied to the 2N time domain samples, resulting in an output $a_m(k)$, k=0, 1, 2, ..., 2N−1 (2N frequency domain samples), for example in the form in Eq. (12).

The output of the 2N-Point FFT 220 results in ASK symbols that may not be exactly equal to that of the originally transmitted ASK symbols. Error may be introduced due to many factors such as channel noise, fading, rounding, quantization error, etc. A decision 230 is made for each frequency domain sample $a_m(k)$, k=0, 1, 2, ..., 2N−1, which M-ASK symbol from the M-ASK signal set was transmitted. This results in 2N M-ASK symbols per OFDM symbol 235.

Each M-ASK symbol is then de-mapped 240 to $\log_2 M$ bits. The 2N M-ASK symbols collectively map to $N_b=2N \log_2 M$ bits. These are then converted using a parallel to serial (P/S) 250 to a serial stream of bits 260.

A variation on the method described above for demodulation of the complex ASK-OFDM symbol in which XOFDM symbols with N time domain samples are received can also be applied to XOFDM symbols in which N+1 time domain samples are received. A main difference is that the separation of a complex time domain samples into two individual real elements is not performed.

The serial to parallel converter converts the received baseband signal into N+1 parallel time domain samples and the N+1 parallel time domain samples are then expanded 210 using conjugate symmetric expanding to 2N time domain samples 215 based on the N+1 time domain samples having conjugate symmetry. The remainder of the method is the same as described above.

As a real ASK-OFDM symbol will contain N+1 received time domain samples, real ASK-OFDM demodulation is performed in a similar manner to that of N+1 time domain sample XOFDM described above.

Figure 2B:
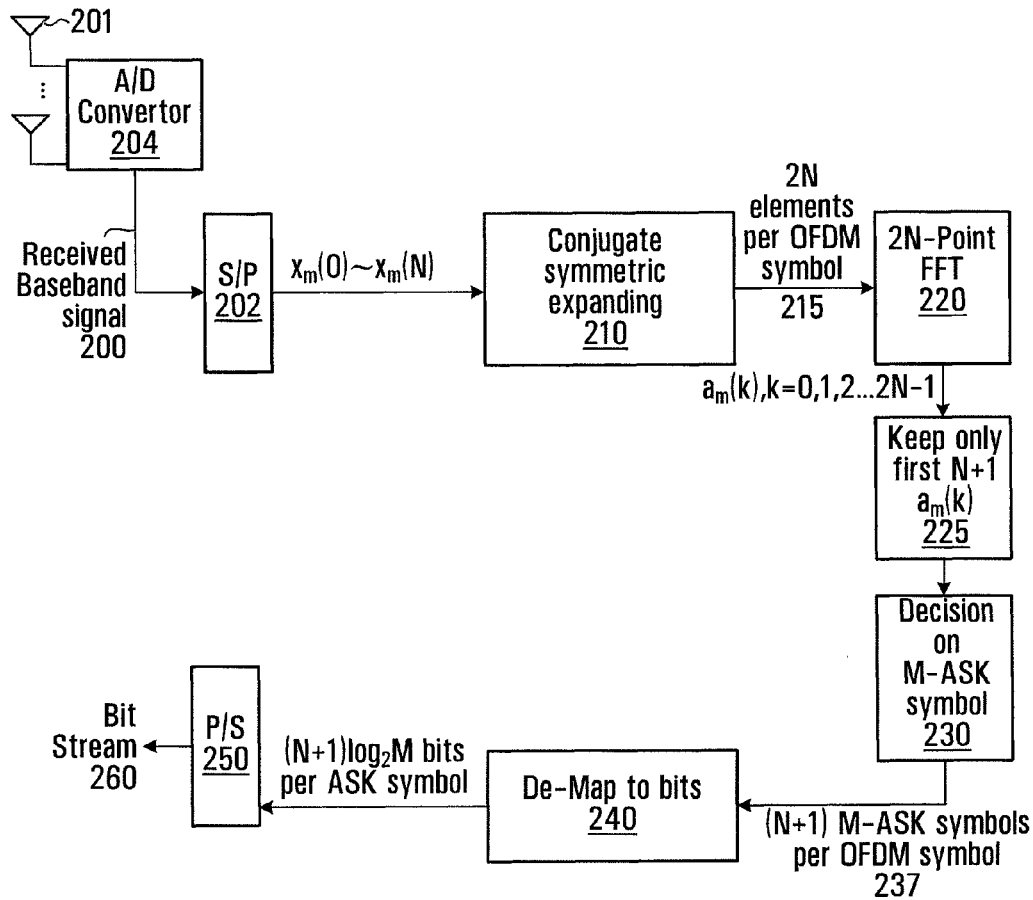
FIG. 2B is a block diagram of a method used to demodulate real baseband ASK-OFDM symbols.

FIG. 2B illustrates a method used for demodulation of real ASK-OFDM symbols. FIG. 2B can be considered to describe a method as well as physical structure that may be used to implement the method. In some embodiments, prior to the first step of FIG. 2B, an RF band signal is received using one or more antennas 201 and down converted to an analog baseband signal and the analog signal baseband signal is converted to a discrete baseband ROFDM signal 200, for example with an analog to digital (A/D) converter 204. ROFDM baseband signal 200 is converted by using a serial to parallel converter (S/P) 202 from a serial stream of time domain samples to a parallel set of time domain samples. In the illustrated example, the parallel set of time domain samples includes $x_m(0)$ to $x_m(N)$.

The time domain samples $x_m(0)$ to $x_m(N)$ are then expanded 210 using conjugate symmetric expanding to 2N time domain samples 215 based on the N+1 time domain samples having conjugate symmetry.

A 2N-Point FFT 220 is applied to the 2N time domain samples, resulting in an output $a_m(k)$ (2N frequency domain samples).

The output of the 2N-Point FFT 220 results in $a_m(k)$, k=0, 1, 2, ..., 2N−1 frequency domain samples. Due to the conjugate symmetry of the real signal, only the first N+1 frequency domain samples need to be kept 225.

The output of the 2N-Point FFT 220 results in ASK symbols that may not be exactly equal to that of the originally transmitted ASK symbols. Error may be introduced due to many factors such as channel noise, fading, rounding, quantization error, etc. A decision 230 is made for each kept frequency domain sample $a_m(k)$, k=0, 1, 2, ..., N, which M-ASK symbol from the M-ASK signal set was transmitted, resulting in N+1 M-ASK symbols per OFDM symbol 237.

Each M-ASK symbol is then de-mapped 240 to $\log_2 M$ bits. The N+1 M-ASK symbols collectively map to $N_b=(N+1)\log_2 M$ bits. These are then converted using a parallel to serial (P/S) 250 to a serial stream of bits 260.

Figure 2C:
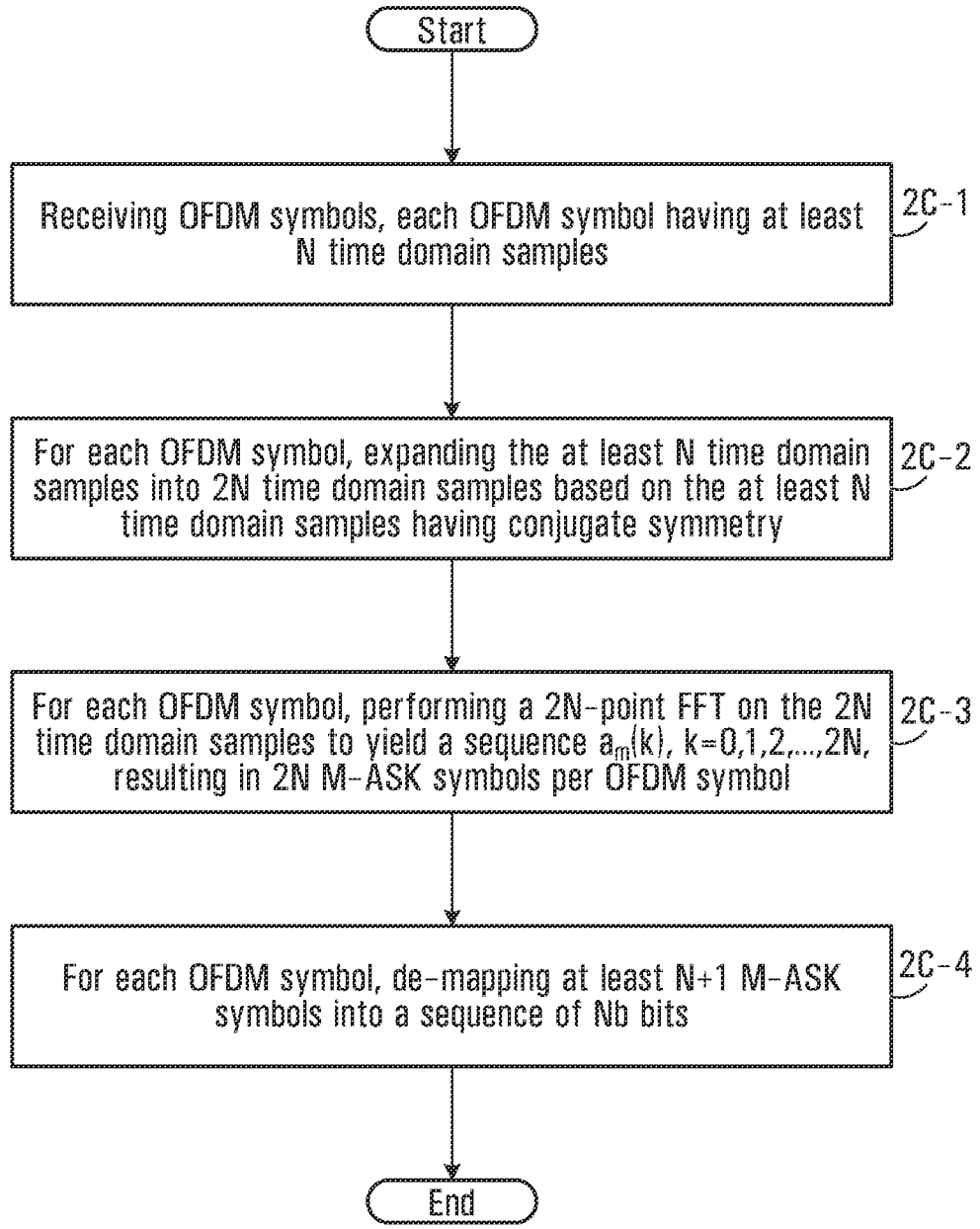
FIG. 2C is a block diagram of a method used to receive and demodulate ASK-OFDM symbols.

A method for receiving and demodulating ASK-ODFM symbols for XOFDM or ROFDM will be described with reference to the flow chart of FIG. 2C.

Step 2C-1 includes receiving OFDM symbols, each OFDM symbol having at least N time domain samples.

Step 2C-2 includes for each OFDM symbol, expanding the at least N time domain samples into 2N time domain samples based on the at least N time domain samples having conjugate symmetry.

Step 2C-3 includes for each OFDM symbol, performing a 2N-point FFT on the 2N time domain samples to yield a sequence $a_m(k)$, k=0, 1, 2, ..., 2N, resulting in 2N M-ASK symbols per OFDM symbol.

Step 2C-4 includes for each OFDM symbol, de-mapping at least N+1 M-ASK symbols into a sequence of $N_b$ bits.

The methods described above with regard to FIGS. 2A and 2B are implemented by a device receiving an OFDM signal. In some embodiments, the device is a mobile station. In some embodiments, the device is a base station used to communicate with mobile stations.

In some embodiments the methods can be physically implemented using techniques familiar to those skilled in the field of the application. For example, using application specific integrated circuits (ASIC) or field programmable gate arrays (FPGA) for a hardware implementation. To implement the methods in software, in some embodiments a microprocessor capable of performing basic digital signal processing operations is utilized.

Performance Results in Additive White Gaussian Noise (AWGN)

Since in an ASK-OFDM system, each subcarrier is independently modulated, the symbol error rate (SER) of the ASK symbols of each subcarrier in AWGN should be the same as the SER of a regular ASK system. The SER of a regular M-ary ASK in AWGN is $$P_s = \frac{M-1}{M} \mathrm{erfc}\left(\sqrt{\frac{3}{M^2-1}\frac{E_s}{N_0}}\right) \text{ for } M\text{-}ASK \qquad (13)$$

where $N_0/2$ is the power spectral density (PSD) of the AWGN, and $E_s$ the average signal energy of each ASK symbol. This formula is applicable to the ASK symbol error rate of the ASK-OFDM system discussed above, if $E_s$ represents the energy of each ASK symbol of a period of 2T, used in transmitting the full sequence of $x_m(n)$. However, in some embodiments, since only N elements of $x_m(n)$ are transmitted in a period of T to represent 2N complex ASK symbols, Eq. (13) should be modified as $$P_s = \frac{M-1}{M} \mathrm{erfc}\left(\sqrt{\frac{3}{2(M^2-1)}\frac{E_s}{N_0}}\right) \qquad (14)$$

$$= \frac{M-1}{M} \mathrm{erfc}\left(\sqrt{\frac{3\log_2 M}{2(M^2-1)}\frac{E_b}{N_0}}\right)$$

for complex $M$-$ASK$-$OFDM$ where $E_s$ is the energy transmitted in the time period T for each subcarrier, and $E_b$ is the corresponding energy of each bit. The modification of Eq. (14) for ROFDM is simple and straightforward. It should be emphasized that $P_s$ in Eq. (14) is the ASK symbol error rate of ASK-OFDM of each subcarrier, not the ASK-OFDM symbol error rate.

The error performance predicted by Eq. (14) appears worse than that predicted by Eq. (13) by a factor of two, which is 3 dB. However, this does not mean a degradation of the error performance of ASK-OFDM compared to ASK. Instead, it is simply because $E_s$ in Eq. (14) represents the energy of an ASK symbol in ASK-OFDM transmitted in a period of T rather than 2T.

Figure 3:
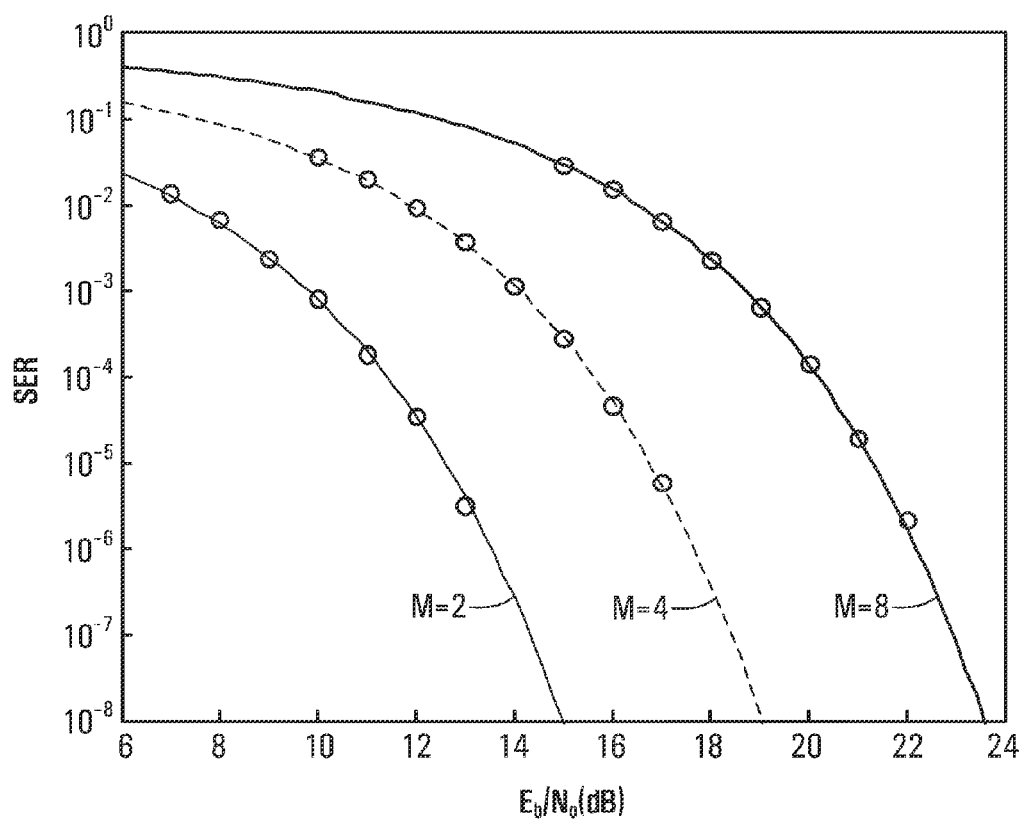
FIG. 3 is a graphical plot of ASK symbol error rate of each subcarrier in an ASK-OFDM system for M=2, 4 and 8 accompanied by simulation results for N=16.

FIG. 3 is a graphical plot of $E_b/N_o$ versus symbol error rate for ASK OFDM. The plotted lines in FIG. 3 show the ASK symbol error rate of ASK-OFDM according to Eq. (14) for values of M=2, 4 and 8. The lines are accompanied by simulation results for N=16 indicated by the plurality of "o" symbols. Eq. (14) is well supported by the simulation results.

Figure 4:
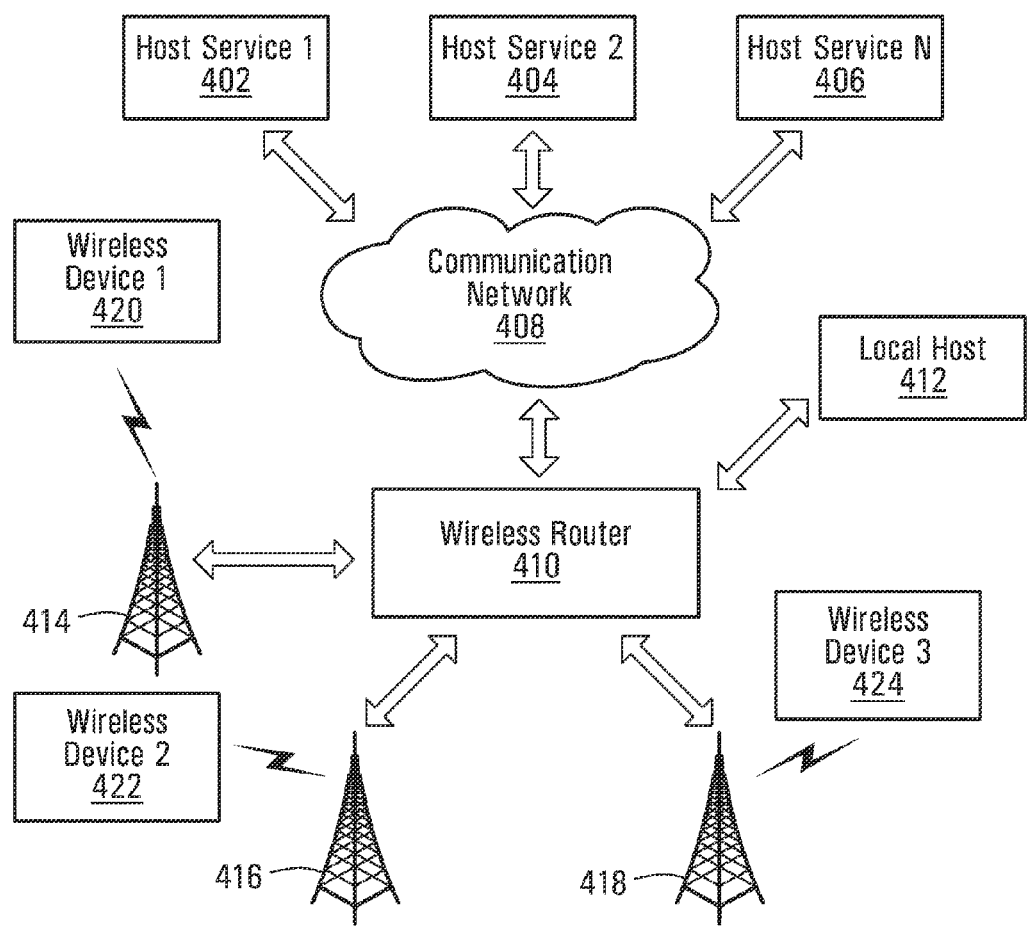
FIG. 4 is a block diagram of a communications network on which embodiments of the application may be implemented.

FIG. 4 is an exemplary environment in which a wireless communication system 400 in accordance with some embodiments may be practiced. Communications between illustrated network elements can be implemented using the above-summarized ASK-OFDM methods and systems. The exemplary wireless communication system 400 includes a plurality of host services (three shown, 402, 404, and 406), each of which may have a plurality of services such as, but not limited to, e-mail, calendar, Internet web browser, and other applications, available to their subscribers. In this particular example, the host services 402, 404, and 406 are typically configured as servers, each containing at least one processor, a storage means and each using a network interface over which communications with a communication network 408 such as the Internet can be effectuated. The host services 402, 404 and 406 send and receive messages over communications network 408 to and from wireless router system 410 allowing communication between the host services 402, 404, and 406 and the wireless router system 410.

The wireless router system 410 is connected to a plurality of wireless networks (three shown, 414, 416, and 418), each of which may support a plurality of mobile devices (one in each wireless network is shown, 420, 422, and 424). The wireless networks 414, 416, and 418 may be a cellular telephone network, such as a global system for mobile communication (GSM) network, or a code division multiple access (CDMA) network, a two-way paging network, a short range wireless network such as Bluetooth™, an IEEE 802.11 compliant network, and others alike. The mobile devices 420, 422, and 424 are devices compatible with the corresponding wireless network.

Mobile communications devices 420, 422 and 424 are two-way communication devices with advanced data communication capabilities having the capability to communicate with other mobile devices or computer systems, such as host services 402, 404, 406, through a network of transceiver stations, including wireless router 410 and communication network 408. The mobile communication devices 420, 422 and 424 may also have the capability to allow voice communication. Depending on the functionality provided, it may be referred to as a data messaging device, a two-way pager, a cellular telephone with data messaging capabilities, a wireless Internet appliance, or a data communication device (with or without telephony capabilities). The preceding list is not meant to be exhaustive; the embodiments described herein can be practiced with any type of mobile device, whether listed above or not. In the example shown in FIG. 4, mobile communications devices 420, 422 and 424 each contain a processor, a radio, an information storage means and at least one software module adapted to perform tasks. In a preferred embodiment, mobile communications devices 420, 422 and 424 are capable of sending and receiving messages using the radio. Also in the preferred embodiment, the at least one software module includes an event generator module, adapted to generate events, and a communications module, adapted to send and receive messages using the mobile communications device's radio.

Mobile communications devices are generally capable of communicating over multiple communication channels. For example, short message service (SMS) messages arrive over the voice communication channel, whereas email messages arrive over a data communication channel. As explained above, the mobile communications device 420 includes modules, software for example, which are adapted to perform various tasks when executed in mobile communications device 420's processor. In one embodiment, the mobile communications device 420 contains both a communication module and an event generator module. The communication module is adapted to execute in mobile communications device 420's processor and in cooperation with the mobile communications device 420's radio is capable of sending and receiving messages. The event generator module is also adapted to execute in mobile communications device 420's processor and is capable of generating events in one of two ways: user generated events and device generated events. User generated events include such things as the user of mobile communications device 420 opening a messaging application resident in mobile communications device 420, such as an email application, the user of mobile communications device 420 rolling a wheel input device, such as a thumbwheel, the user of mobile communications device 420 pressing a key on mobile communications device 420's keyboard, the user of mobile communications device 420 logging in to mobile communications device 420 or the user of mobile communications device 420 electing to maintain an active session by responding to a prompt from mobile communications device 420.

Device generated events include such things as the expiry of a timer, mobile communications device 420 generating a ping message to keep a session alive with the network or mobile communications device 420 commencing a data session, such as a PDP context, with a network.

One of the primary purposes of host services 402, 404 and 406 is to process information received from other sources, such as mail servers (not shown) and mobile communications devices 420, 422, 424, and send the information on to the appropriate recipient, typically a different host service 402, 404, 406, mail server or mobile communications device 420, 422 or 424. Host services 402, 404 and 406 are configured to send and receive email messages and as such typically communicate with a mail server. Mail servers could include for example a Microsoft® Exchange® server, a Lotus® Domino® server, a Novell® GroupWise® server, an IMAP Server, a POP Server or a webmail server or any other mail server as would be understood by those in the art. The host services 402, 404 and 406 also contain a software module, which executes in their processor to achieve the desired sending and receiving of messages as well as the appropriate processing of information. In a preferred embodiment the software module of each host service 402, 404, 406 is a messaging module, the messaging module is adapted to receive messages from at least one external mail server, send messages to mobile communications devices 420, 422, 424, receive messages from the same mobile communications devices and send messages to the at least one external mail server(s). The at least one external mail server(s) could also be at least one mobile data server(s) for example. The wireless router system 410 may also be directly connected to a host service, such as a local service 412, without the communication network 408. In another embodiment, it is possible for host services 402, 404 and 406 to communicate directly with mobile communications devices 420, 422 and 424. In this embodiment, host services 402, 404 and 406 must be capable of addressing communications to mobile communications devices 420, 422 and 424 without the aid of the wireless router system 410.

In the environment described in FIG. 4, messaging occurs between mobile communications devices 420, 422 and 424 and host services 402, 404 and 406. It is possible for mobile communications devices 420, 422 and 424 to send messages to and receive messages from host services 402, 404 and 406. As an example, when a message is received by any one of host services 402, 404, 406, the intended recipient, mobile communications devices 420, 422 and 424 is informed by the host service 402, 404 and 406 that a message has arrived which needs to be retrieved by way of an enable message. Host service 402, 404 and 406 may send a plurality of enable messages to mobile communications device 420, 422 and 424 or host service 402, 404 and 406 may choose to send one enable message until mobile communications device 420, 422 and 424 fetches the pending message(s). A fetch command is issued by the mobile communications device 420, 422 and 424 upon the generation of an event by an event generator after an enable message has been received and is sent to host service 402, 404 and 406. The generated event and the enable message are independent and neither one influences the occurrence or likelihood of the other. When host service 402, 404 and 406 receives a fetch command, host services 402, 404 and 406 will send the pending message or messages to mobile communications device 420, 422 and 424 which issued the fetch command. Both the enable messages and the fetch message may or may not contain message identifiers. A message identifier uniquely identifies a message for mobile communications devices 420, 422 and 424 and allows mobile communications devices 420, 422 and 424 to retrieve specific messages. The host service 402, 404, 406 may send all pending messages should multiple messages be pending for the mobile communications device 420, 422 and 424 which issued the fetch command.

Figure 5:
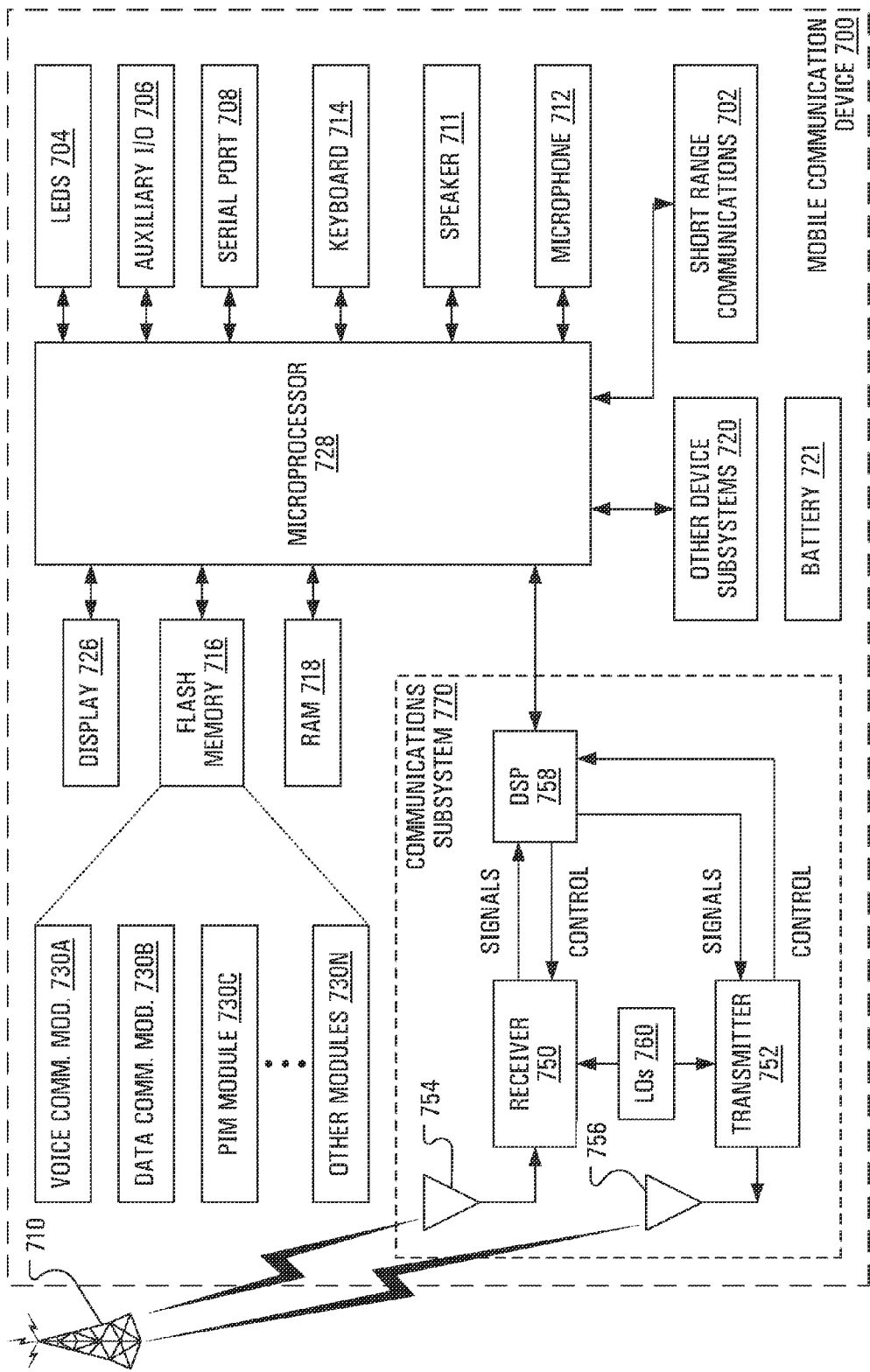
FIG. 5 is a block diagram of an example mobile communication device.

Referring now to FIG. 5, shown is a block diagram of a mobile communication device 700 that may implement mobile device related methods described herein. It is to be understood that the mobile device 700 is shown with very specific details for example purposes only.

A processing device (a microprocessor 728) is shown schematically as coupled between a keyboard 714 and a display 726. The microprocessor 728 controls operation of the display 726, as well as overall operation of the mobile device 700, in response to actuation of keys on the keyboard 714 by a user.

The mobile device 700 has a housing that may be elongated vertically, or may take on other sizes and shapes (including clamshell housing structures). The keyboard 714 may include a mode selection key, or other hardware or software for switching between text entry and telephony entry.

In addition to the microprocessor 728, other parts of the mobile device 700 are shown schematically. These include: a communications subsystem 770; a short-range communications subsystem 702; the keyboard 714 and the display 726, along with other input/output devices including a set of LEDS 704, a set of auxiliary I/O devices 706, a serial port 708, a speaker 711 and a microphone 712; as well as memory devices including a flash memory 716 and a Random Access Memory (RAM) 718; and various other device subsystems 720. The mobile device 700 may have a battery 721 to power the active elements of the mobile device 700. The mobile device 700 is in some embodiments a two-way radio frequency (RF) communication device having voice and data communication capabilities. In addition, the mobile device 700 in some embodiments has the capability to communicate with other computer systems via the Internet.

Operating system software executed by the microprocessor 728 is in some embodiments stored in a persistent store, such as the flash memory 716, but may be stored in other types of memory devices, such as a read only memory (ROM) or similar storage element. In addition, system software, specific device applications, or parts thereof, may be temporarily loaded into a volatile store, such as the RAM 718. Communication signals received by the mobile device 700 may also be stored to the RAM 718.

The microprocessor 728, in addition to its operating system functions, enables execution of software applications on the mobile device 700. A predetermined set of software applications that control basic device operations, such as a voice communications module 730A and a data communications module 730B, may be installed on the mobile device 700 during manufacture. In addition, a personal information manager (PIM) application module 730C may also be installed on the mobile device 700 during manufacture. The PIM application is in some embodiments capable of organizing and managing data items, such as e-mail, calendar events, voice mails, appointments, and task items. The PIM application is also in some embodiments capable of sending and receiving data items via a wireless network 710. In some embodiments, the data items managed by the PIM application are seamlessly integrated, synchronized and updated via the wireless network 710 with the device user's corresponding data items stored or associated with a host computer system. As well, additional software modules, illustrated as other software module 730N, may be installed during manufacture.

Communication functions, including data and voice communications, are performed through the communication subsystem 770, and possibly through the short-range communications subsystem 702. The communication subsystem 770 includes a receiver 750, a transmitter 752 and one or more antennas, illustrated as a receive antenna 754 and a transmit antenna 756. In addition, the communication subsystem 770 also includes a processing module, such as a digital signal processor (DSP) 758, and local oscillators (LOs) 760. The specific design and implementation of the communication subsystem 770 is dependent upon the communication network in which the mobile device 700 is intended to operate. For example, the communication subsystem 770 of the mobile device 700 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access CDMA, Personal Communications Service (PCS), Global System for Mobile Communications (GSM), etc. Other types of data and voice networks, both separate and integrated, may also be utilized with the mobile device 700.

Network access may vary depending upon the type of communication system. For example, in the Mobitex™ and DataTAC™ networks, mobile devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the mobile device 700 may send and receive communication signals over the communication network 710. Signals received from the communication network 710 by the receive antenna 754 are routed to the receiver 750, which provides for signal amplification, frequency down conversion, filtering, channel selection, etc., and may also provide analog to digital conversion. Analog-to-digital conversion of the received signal allows the DSP 758 to perform more complex communication functions, such as demodulation and decoding. In a similar manner, signals to be transmitted to the network 710 are processed (e.g., modulated and encoded) by the DSP 758 and are then provided to the transmitter 752 for digital to analog conversion, frequency up conversion, filtering, amplification and transmission to the communication network 710 (or networks) via the transmit antenna 756.

In addition to processing communication signals, the DSP 758 provides for control of the receiver 750 and the transmitter 752. For example, gains applied to communication signals in the receiver 750 and the transmitter 752 may be adaptively controlled through automatic gain control algorithms implemented in the DSP 758.

In a data communication mode, a received signal, such as a text message or web page download, is processed by the communication subsystem 770 and is input to the microprocessor 728. The received signal is then further processed by the microprocessor 728 for an output to the display 726, or alternatively to some other auxiliary I/O devices 706. A device user may also compose data items, such as e-mail messages, using the keyboard 714 and/or some other auxiliary I/O device 706, such as a touchpad, a rocker switch, a thumb-wheel, or some other type of input device. The composed data items may then be transmitted over the communication network 710 via the communication subsystem 770.

In a voice communication mode, overall operation of the device is substantially similar to the data communication mode, except that received signals are output to a speaker 711, and signals for transmission are generated by a microphone 712. Alternative voice or audio I/O subsystems, such as a voice message recording subsystem, may also be implemented on the mobile device 700. In addition, the display 716 may also be utilized in voice communication mode, for example, to display the identity of a calling party, the duration of a voice call, or other voice call related information.

The short-range communications subsystem 702 enables communication between the mobile device 700 and other proximate systems or devices, which need not necessarily be similar devices. For example, the short-range communications subsystem may include an infrared device and associated circuits and components, or a Bluetooth™ communication module to provide for communication with similarly-enabled systems and devices.

In some embodiments, the transmitter 752 and/or the receiver 750 in communications subsystem 770 are enabled to implement the ASK-OFDM scheme as described above. In some embodiments, network devices, for example base stations, in the network 710 are also enabled to implement the ASK-OFDM scheme described above.

The above-discussed OFDM transmission schemes can be employed between the wireless network and mobile communications device for uplink and/or downlink transmission. More generally they are applicable to wireless communications between a transmitter and a receiver. However, these schemes can also be used in wire line applications, or for storage applications.

Many modifications and other embodiments will come to the mind of one skilled in the art having the benefit of the teachings presented in the foregoing descriptions and the associated drawings. Therefore, it is understood that the description is not to be limited to the specific embodiments disclosed, and that modifications and embodiments are intended to be included within the scope of the appended claims.

The invention claimed is:

1. A method for use in a receiver comprising:
receiving orthogonal frequency division multiplexing (OFDM) symbols, each OFDM symbol having N time domain samples, where N is an integer, one time domain sample of which is a complex value time domain sample comprising two time domain samples, one of which is a real component of the complex value time domain sample and one of which is an imaginary component of the complex value time domain sample; and
for each OFDM symbol:
separating the real and imaginary components of the complex value time domain sample into two real time domain samples such that the OFDM symbol now has a total of N+1 time domain samples;
expanding the N+1 time domain samples into 2N time domain samples based on applying conjugate symmetry to N−1 of the N+1 time domain samples;
performing a 2N-point Fast Fourier Transform (FFT) on the 2N time domain samples to yield a sequence $a_m(k)$, k=0, 1, 2, ..., 2N−1, resulting in 2N M-ary amplitude-shift keying (M-ASK) symbols per OFDM symbol; and de-mapping each M-ASK symbol of the 2N M-ASK symbols into a sequence of $N_b=(2N) \log_2 M$ bits, where M is the number of signals in an M-ASK signal set.

2. The method of claim 1 further comprising:
prior to separating the real and imaginary components of the complex value time domain sample into two real time domain samples, multiplying the complex value time domain sample by a scaling factor used to maintain average transmission power for all N time domain samples.

3. The method of claim 1 further comprising deciding an appropriate value for each frequency domain sample of the 2N M-ASK symbols per OFDM symbol resulting from the 2N-point FFT.

4. The method of claim 1, further comprising:
keeping all of the 2N frequency domain samples of the sequence $a_m(k)$, $k=0, 1, 2, \ldots, 2N-1$; and
de-mapping the 2N M-ASK symbols into the sequence of $N_b=(2N) \log_2 M$ bits.

5. The method of claim 1 further comprising:
keeping only N+1 of the 2N frequency domain samples of the sequence $a_m(k)$, $k=0, 1, 2, \ldots, 2N-1$; and
de-mapping the N+1 M-ASK symbols into a sequence of $N_b=(N+1) \log_2 M$ bits.

6. A receiver comprising:
a receiving section including at least one receiving antenna configured to obtain orthogonal frequency division multiplexing (OFDM) symbols, each OFDM symbol having N time domain samples, where N is an integer, one time domain sample of which is a complex value time domain sample comprising two time domain samples, one of which is a real component of the complex value time domain sample and one of which is an imaginary component of the complex value time domain sample; and
for each OFDM symbol:
a separator configured to separate the real and imaginary components of the complex value time domain sample into two real time domain samples such that the OFDM symbol now has a total of N+1 time domain samples;
an expander configured to expand the N+1 time domain samples into 2N time domain samples based on applying conjugate symmetry to N−1 of the N+1 time domain samples;
a Fast Fourier Transformer configured to perform a 2N-point Fast Fourier Transform (FFT) on the 2N time domain samples to yield a sequence $a_m(k)$, $k=0, 1, 2, \ldots, 2N-1$, resulting in 2N M-ary amplitude-shift keying (M-ASK) symbols per OFDM symbol; and
a de-mapper configured to de-map each M-ASK symbol of the 2N M-ASK symbols into a sequence of $N_b=(2N) \log_2 M$ bits, where M is the number of signals in an M-ASK signal set.

7. The receiver of claim 6, wherein the receiver is part of a mobile station.

8. The receiver of claim 6, wherein the receiver is part of a base station.

9. The receiver of claim 6, further comprising:
prior to the separator separating the real and imaginary components of the complex value time domain sample into the two real time domain samples, a multiplier configured to multiply the complex value time domain sample by a scaling factor used to maintain average power for all N time domain samples.

10. The receiver of claim 9, wherein the receiving section further includes an analog to digital converter configured to convert an analog baseband signal from the at least one receiving antenna into a digital baseband signal.

11. The receiver of claim 10, wherein the receiving section further includes a serial to parallel converter configured to convert the digital baseband signal into the OFDM symbols, provide the complex value time domain sample to the multiplier, and provide the N+1 time domain samples to the expander.

12. The receiver of claim 6, further comprising a parallel to serial converter configured to convert the sequence of $N_b=(2N) \log_2 M$ bits into a bit stream.

13. The receiver of claim 6 further comprising processing logic configured to decide an appropriate value for each frequency domain sample of the 2N M-ASK symbols per OFDM symbol resulting from the 2N-point FFT.

14. The receiver of claim 13, wherein the processing logic is further configured to:
keep all of the 2N frequency domain samples of the sequence $a_m(k)$, $k=0, 1, 2, \ldots, 2N-1$; and
the de-mapper is configured to de-map the 2N M-ASK symbols into the sequence of $N_b=(2N) \log_2 M$ bits.

15. The receiver of claim 13, wherein the processing logic is further configured to:
keep only N+1 of the 2N frequency domain samples of the sequence $a_m(k)$, $k=0, 1, 2, \ldots, 2N-1$; and
the de-mapper is configured to de-map the N+1 M-ASK symbols into a sequence of $N_b=(N+1) \log_2 M$ bits.

16. A non-transitory computer-readable medium having stored thereon program instructions executable by a processor, that when executed, cause the processor to:
receive orthogonal frequency division multiplexing (OFDM) symbols, each OFDM symbol having N time domain samples, where N is an integer, one time domain sample of which is a complex value time domain sample comprising two time domain samples, one of which is a real component of the complex value time domain sample and one of which is an imaginary component of the complex value time domain sample; and
for each OFDM symbol:
separate the real and imaginary components of the complex value time domain sample into two real time domain samples such that the OFDM symbol now has a total of N+1 time domain samples;
expand the N+1 time domain samples into 2N time domain samples based on applying conjugate symmetry to N−1 of the N+1 time domain samples;
perform a 2N-point Fast Fourier Transform (FFT) on the 2N time domain samples to yield a sequence $a_m(k)$, $k=0, 1, 2, \ldots, 2N-1$, resulting in 2N M-ary amplitude-shift keying (M-ASK) symbols per OFDM symbol; and
de-map each M-ASK symbol of the 2N M-ASK symbols into a sequence of $N_b=(2N) \log_2 M$ bits, where M is the number of signals in an M-ASK signal set.

17. The non-transitory computer-readable medium of claim 16 having stored thereon program instructions executable by the processor, that when executed, cause the processor to:
prior to separating the real and imaginary components of the complex value time domain sample into two real time domain samples, multiply the complex value time domain sample by a scaling factor used to maintain average transmission power for all N time domain samples.

18. The non-transitory computer-readable medium of claim 16 having stored thereon program instructions executable by the processor, that when executed, cause the processor to:
- keep all of the 2N frequency domain samples of the sequence $a_m(k)$, k=0, 1, 2, ..., 2N−1; and
- de-map the 2N M-ASK symbols into the sequence of $N_b = (2N) \log_2 M$ bits.

19. The non-transitory computer-readable medium of claim 16 having stored thereon program instructions executable by the processor, that when executed, cause the processor to:
- keep only N+1 of the 2N frequency domain samples of the sequence $a_m(k)$, k=0, 1, 2, ..., 2N−1; and
- de-map the N+1 M-ASK symbols into a sequence of $N_b = (N+1) \log_2 M$ bits.

* * * * *